B. F. COOPER.
TRACTOR.
APPLICATION FILED APR. 12, 1915.

1,306,579.

Patented June 10, 1919.
4 SHEETS—SHEET 1.

Witness

Inventor
B. F. Cooper,
By Wm. E. Dyre,
Attorney

B. F. COOPER.
TRACTOR.
APPLICATION FILED APR. 12, 1915.

1,306,579.

Patented June 10, 1919.
4 SHEETS—SHEET 2.

Witness

Inventor
B. F. Cooper,
By Wm E. Dyre,
Attorney

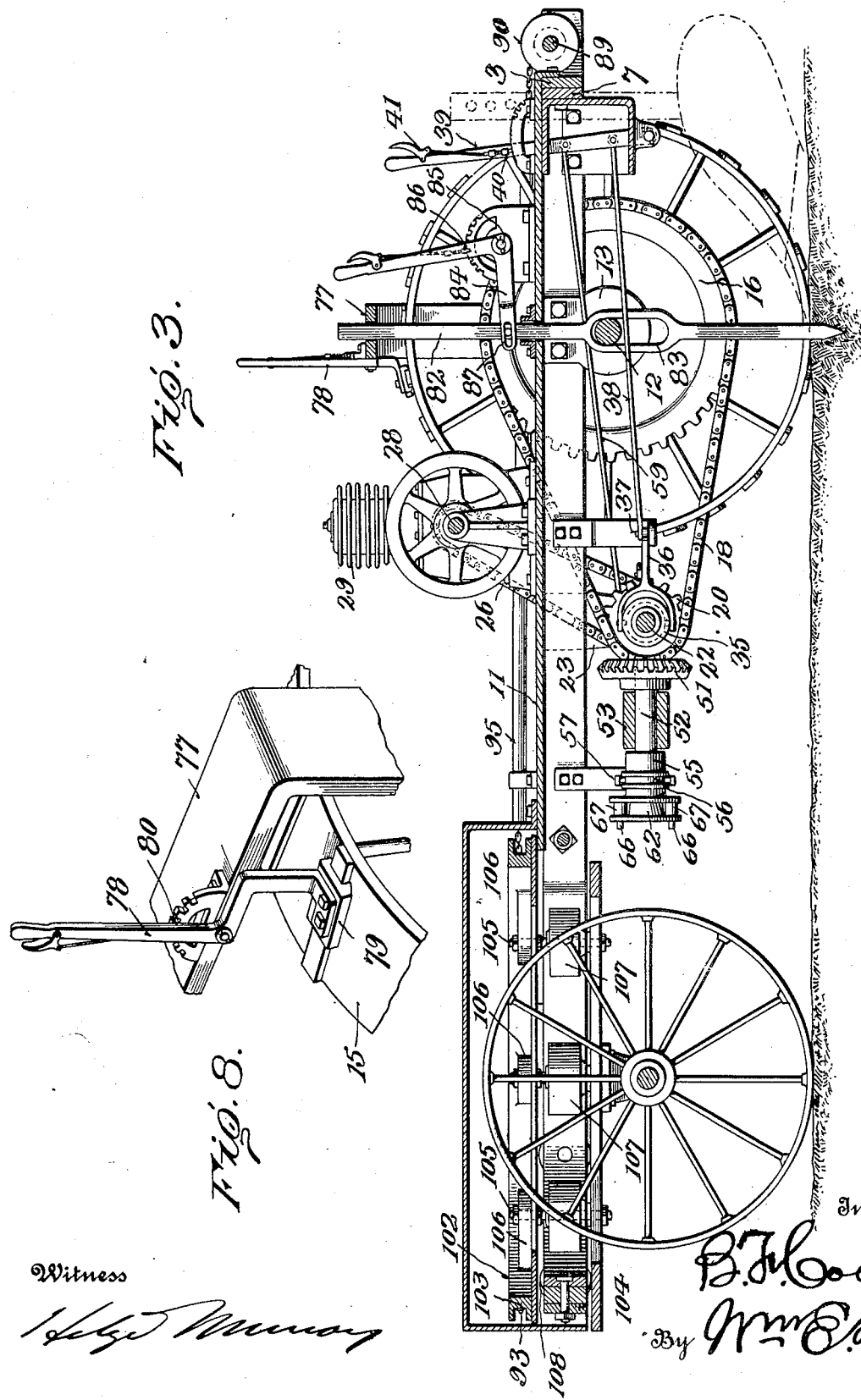

B. F. COOPER.
TRACTOR.
APPLICATION FILED APR. 12, 1915.
1,306,579.
Patented June 10, 1919.
4 SHEETS—SHEET 4.
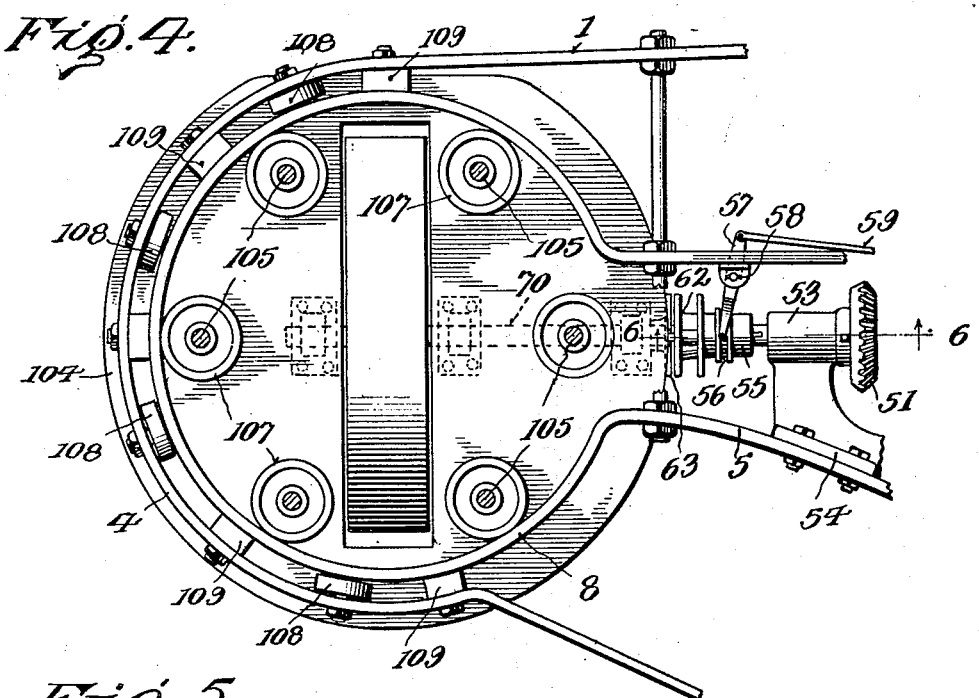
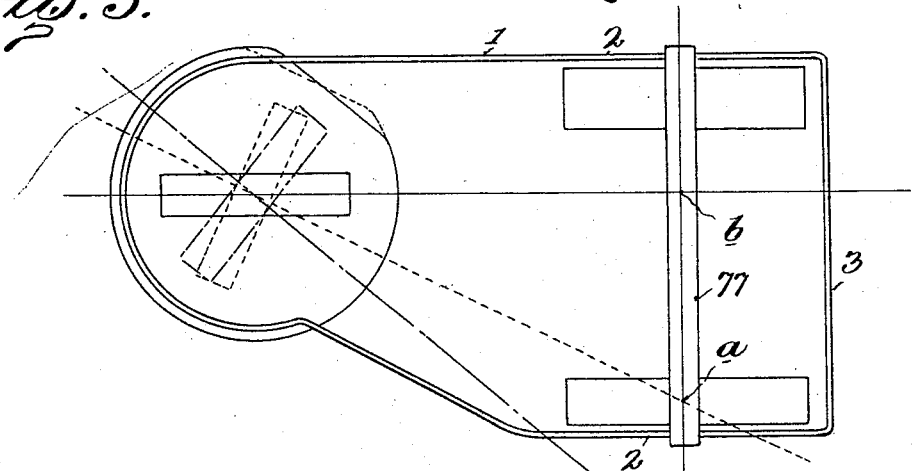
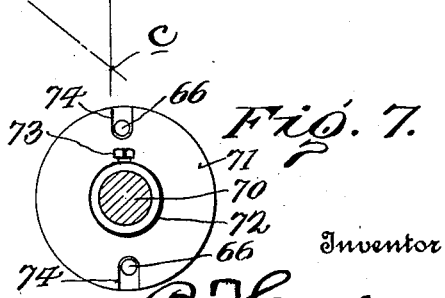
Inventor
B. F. Cooper,
By Wm. E. Dyre,
Attorney
Witness

UNITED STATES PATENT OFFICE.

BENJAMIN F. COOPER, OF CASSOPOLIS, MICHIGAN, ASSIGNOR OF ONE-THIRD TO H. H. STEDMAN AND ONE-THIRD TO GEORGE E. WAGNER, BOTH OF CASSOPOLIS, MICHIGAN.

TRACTOR.

1,306,579.  Specification of Letters Patent.  Patented June 10, 1919.

Application filed April 12, 1915. Serial No. 20,872.

*To all whom it may concern:*

Be it known that I, BENJAMIN F. COOPER, a citizen of the United States, residing at Cassapolis, in the county of Cass and State of Michigan, have invented certain new and useful Improvements in Tractors; and I do hereby declare the following to be a full, clear, and exact description of the invention, such as will enable others skilled in the art to which it appertains to make and use the same.

This invention relates to certain new and useful improvements in traction engines, and is primarily designed for use in connection with certain agricultural implements and other useful road work, such as hauling and the like.

The gist of my invention is the production of a self-propelled vehicle of the tractor type in which novel means is provided for easily and effectively turning and steering the vehicle, so that turns of varying radii, and especially those of a short nature, can be readily accomplished with a minimum amount of manual control and in a very short period of time.

Another object of my invention is to produce a tractor, including means for readily locating the center about which the vehicle is to turn, the said means including a rotatable lead wheel of novel construction.

A further object of my invention is the production of a traction engine in which the power used for the propulsion of the vehicle is transmitted by novel devices to certain portions of the tractor mechanism when the turning of the tractor is to be effected in a predetermined direction.

My invention further consists in the combination and arrangement of the several parts hereinafter described and pointed out in the appended claims.

In the drawings:

Fig. 3 is a vertical sectional view taken on the line 3—3 of Fig. 1.

Fig. 4 is a fragmentary plan view of the front part of the tractor illustrating the position of the lead wheel and the clutch mechanism when the tractor is to be turned in a circle upon a point, the circumference of which circle is circumscribed by the lead wheel.

Figure 1:
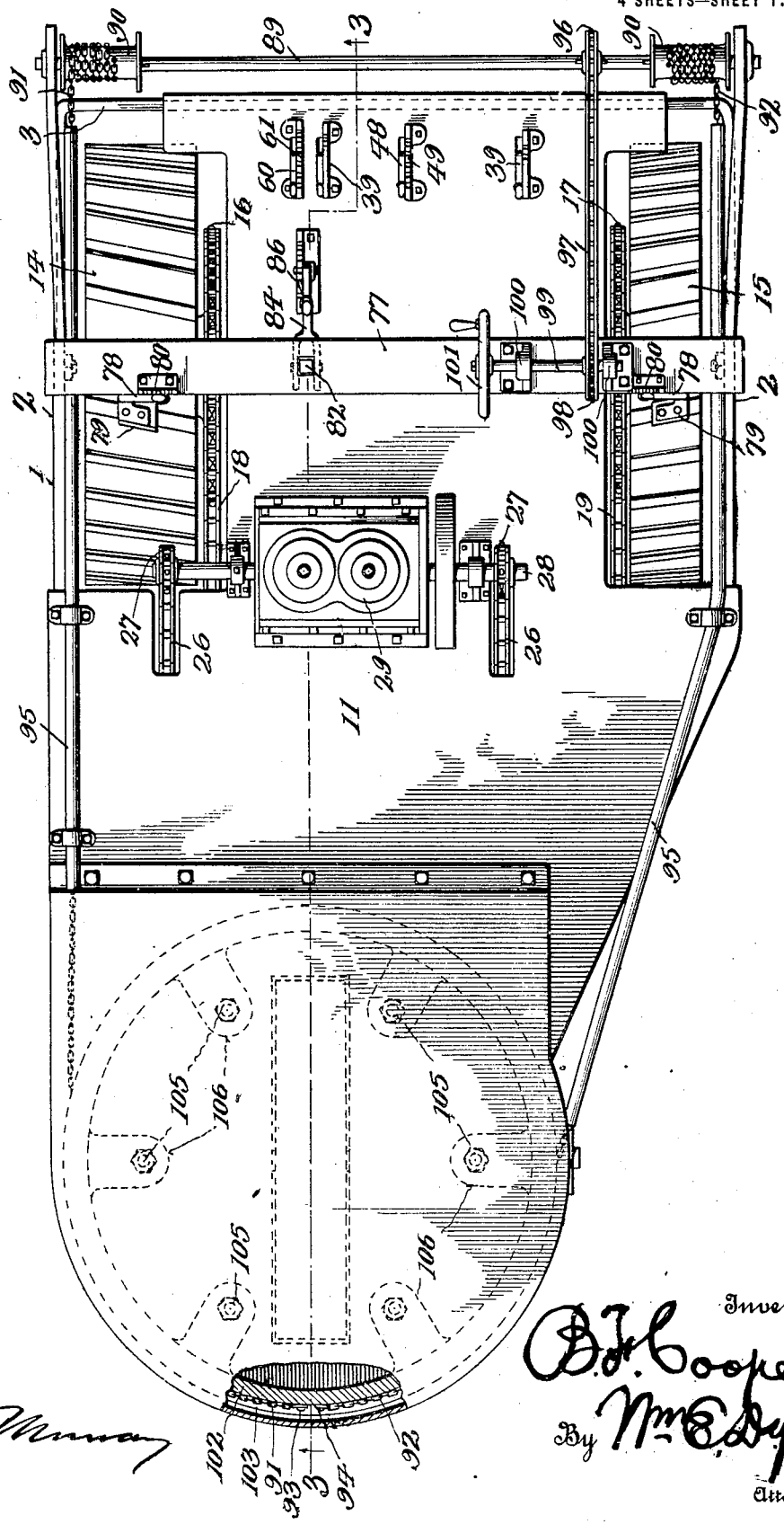
Figure 1 is a top plan view of my improved tractor in the position for straightaway traveling.

Fig. 5 is a diagrammatic illustration of the several positions into which the lead wheel is placed when it is desired to make larger turns than that shown in Fig. 4, the dotted lines illustrating the position of the lead wheel when the tractor is to turn upon a point when the transverse center line of the rear wheels and a corresponding center line drawn through the lead wheel axis intersect at the center of one of the rear wheels; and the dot and dash lines, showing another position when the turn is to be made, is still larger around a point without the tractor where the lines intersect as shown.

Fig. 6 is an enlarged detail sectional view on line 6—6 of Fig. 4 showing the clutch members carried by the main power shaft of the tractor and the lead wheel in engagement when the lead wheel is in the position shown in said figure.

Fig. 7 is a detail section on the line 7—7 of Fig. 6 showing the clutch disk carried by the shaft, which latter also supports and revolves the lead wheel, and Fig. 8 is a detail perspective view of one of the locking devices employed upon the rear wheels of the tractor.

My improved tractor comprises a frame and supporting platform, two spaced rear wheels to which power is transmitted from a suitable engine carried upon the platform for driving the tractor, a lead wheel mounted within a roller bearing turntable support, the said wheel having clutching means for receiving power from the engine when a very short turn is to be made, and a system of levers, clutches and steering mechanism for operating the several parts, as will more fully hereinafter appear.

The engine and operating levers are preferably located upon the rear portion of the platform, thereby leaving the front part of the platform free to carry merchandise and other articles. The clutch and roller bearing are also preferably arranged beneath the platform.

Referring to the drawings: The main frame of the tractor consists of an outer bar structure 1, arranged to extend horizontally of the rear wheels at the sides 2, transversely at the end 3, and slightly offset to partially encircle the front roller bearing turntable as at 4. Positioned within the outer frame is an inner bar structure 5 extending parallel with the rear wheels as at 6, transversely of the tractor as at 7, and offset upon one side to substantially encircle the roller bearing turning device as at 8. These frame sections may be bent from continuous single bars, or they may be formed of shorter length and otherwise suitably joined. This main frame is designed to support the platform 11, and the other parts and mechanism hereinafter described.

Mounted upon a cross shaft 12 within the main frame in bearing brackets 13 are the rear wheels 14 and 15. These wheels are of the usual construction, being of differing widths and provided with the traction cleats, as will be readily understood. Secured to the rear wheels are the respective sprocket wheels 16 and 17, around which pass the sprocket chains 18 and 19 to smaller sprocket wheels 20 and 21 mounted upon the main driving shaft 22.

This main driving shaft 22 extends transversely of the tractor and is supported by the side frames through brackets 23. A center bearing support 24 also serves to support the central portion of the said shaft. Power is transmitted to this shaft through the sprocket wheels 25 mounted thereon, and around which pass sprocket chains 26 to suitable sprocket wheels 27 provided upon each end of the engine shaft 28. The engine 29 may be of any standard type, and is secured to the platform within the control of the operator.

Coöperating with the small sprocket wheels 20 and 21 are clutching members 30 and 31. Each of these clutching members comprises spring-actuated parts capable of engagement when the power is transmitted for driving the tractor.

Positive movement under the control of operating levers is also provided for the manipulation of these respective clutches. The devices for this positive control comprise sliding sleeves 32 keyed to the shaft 22 by the pins 33, adapted to reciprocate thereon by reason of the slots 34. Grooved collars 35 are formed on one end of each sleeve in which operate the forked ends of bell-crank levers 36 pivoted at 37 to respective brackets depending from the frame. To the opposite end of the bell-crank levers 36 rods 38 extend rearwardly to operating hand levers 39 positioned upon the rear of the platform of the tractor and within easy reach of the operator. These levers are provided with the usual locking parts and segments 40 controlled through the hand grips 41, as will be readily understood.

Springs 42 are interposed between the collars 35 of the sliding sleeve members 32 and other collars 43 secured to the main driving shaft 22. The springs are designed to keep the mating parts of the respective clutch members 30 and 31 in engagement with each other until withdrawn by the operation of the hand levers from the platform of the tractor. By this construction it will be seen that the transmission of the power from the driving shaft 22 can be directed through the small sprocket wheels to both of the rear wheels 14 and 15 simultaneously, to one only, or to neither, according to the conditions under which the tractor is to be turned or operated.

In order to disengage the respective clutch members 30 and 31 simultaneously, I provide a mechanism comprising a disk 44 mounted upon a pivot 45 projecting from a bracket carried by the bearing 24. This disk is arranged to oscillate about the pivot 45. Cables 46 are connected to the disk concentrically thereof, and extend to the forked arms of the bell-crank levers 36 where they are secured. A rod 47 is connected to the disk 44 and extends rearwardly to the lower portion of a hand operating lever 48 where it is connected. The hand lever 48 projects through the platform of the tractor and can be readily manipulated by the operator. A suitable pawl and segment 49 is provided upon this lever, and the usual hand grip is provided for its operation in the ordinary manner. When it is desired to simultaneously disengage both clutch members 30 and 31, this hand lever is operated. The disengagement of these members occurs when the lead wheel is to be used as the propelling means for turning the tractor as will more fully hereinafter appear.

Figure 2:
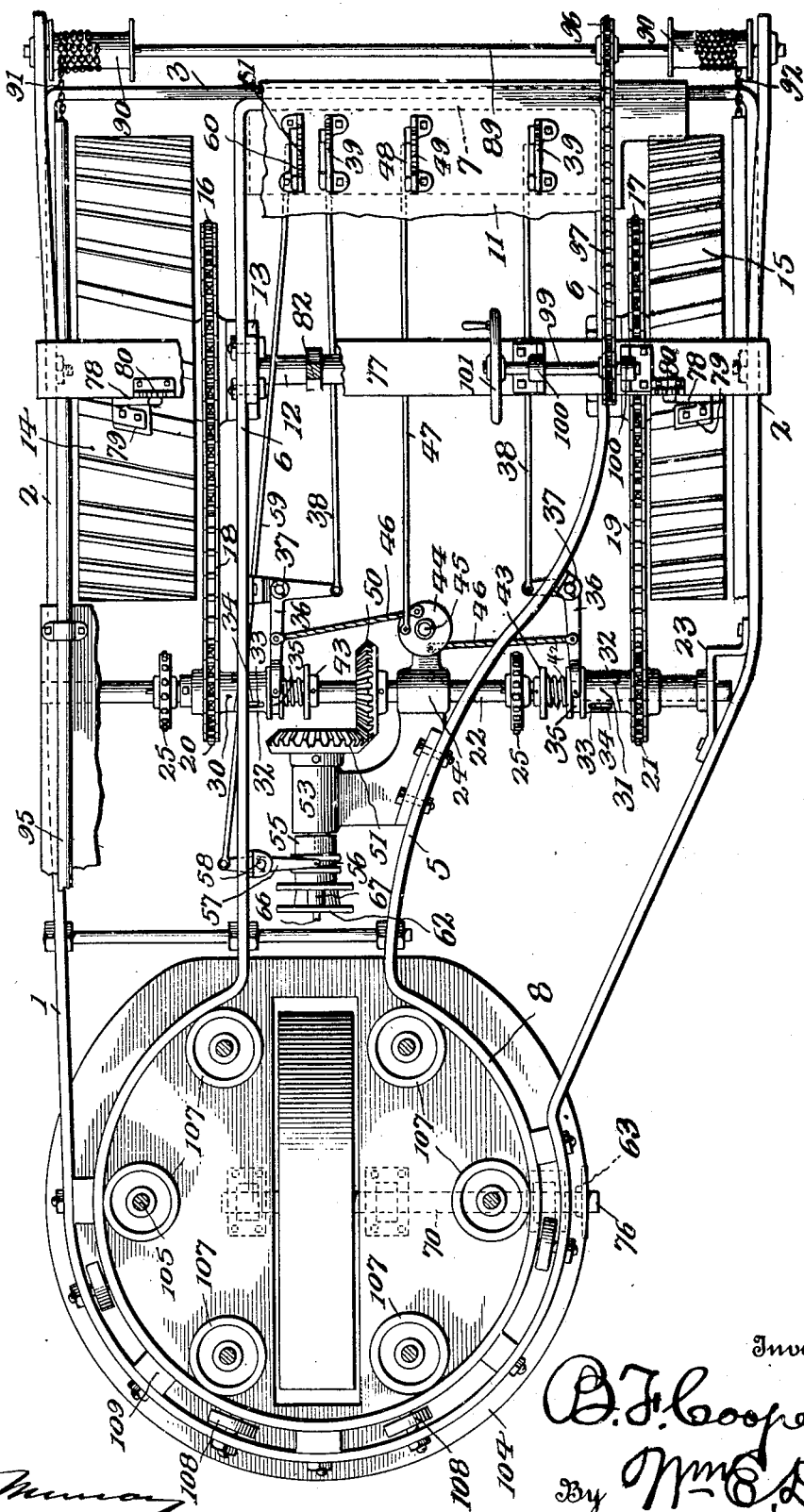
Fig. 2 is a similar view with the upper portion and parts of the platform broken away to show the several clutch mechanisms and the support for the lead wheels.

The clutching mechanism and the means for transmitting power to this front lead wheel will now be described. Keyed to the main shaft 22 is a bevel gear 50 adapted to mesh with a similar gear 51 keyed to a short shaft 52 positioned longitudinally of the tractor in bearing 53. The bearing is formed as a part of the bracket 54 depending from the frame of the tractor, as shown in Figs. 2 and 4. Keyed to, and slidably mounted upon, this shaft 52 is a sleeve 55 provided intermediate its length with a groove 56 for the reception of the forked ends of a lever 57. This lever is pivoted at 58 upon a bracket depending from the frame, and at its opposite end is secured to one end of a rod 59 extending rearwardly to a hand lever 60. This hand lever projects upwardly through the platform of the tractor and is within the reach of the operator. A pawl and segment 61 are associated with the lever in the usual manner, and can be readily operated when the hand grip of the lever is manipulated by the operator. This lever is designed to throw the clutch member 62 carried by the sleeve 55 into and out of engagement with a mating clutch member 63 carried by the shaft upon which the lead wheel is mounted and secured.

The clutch member 62 consists of spaced flanges 64 and 65 preferably formed integral with the sleeve 55. Mounted between these flanges are projecting spring-actuated pins 66. These pins are held within the tubes 67 and are provided with adjustable collars 68. These collars prevent the pins from becoming dislocated. They also receive the force of the springs 69 upon one side thereof in keeping the pins extended.

The mating clutch member 63 carried by the shaft 70 upon which the lead wheel is mounted, comprises a disk 71 provided with a hub 72 through which the securing screw 73 passes. Openings 74 are provided in this disk 71 and they are diametrically disposed to receive the projecting pins 66.

In the operation of this clutch the lead wheel is rotated by means, presently to be described, until the shaft 70 alines with the short shaft 52. The clutch member 62 is withdrawn while this operation is taking place, and it is not until the shaft 70 with the clutch member 63 is brought into alinement that the hand lever 60 is operated, the lever 57 moved and the sliding sleeve 55 carrying the pins 66 is moved forward into engagement with the clutch member 63. Should the openings 74 in the disk 71 not be in register with the pins 66, they will be pressed inwardly upon contacting with the surface of the disk against the action of the springs 69 until the motive power has sufficiently rotated the clutch member 62 to cause them to spring into the said openings, whereby causing the shaft 70 to rotate with the short shaft 52, as will be readily understood. In order to facilitate the alinement of shaft 70 with shaft 52, the sleeve 55 is provided with an internally formed cone recess 75. As the clutch member 62 is brought forward it will be seen that the projecting end 76 of shaft 70 will be directed into alinement with shaft 52.

When the lead wheel is so coupled with the driving shaft 22 it will be seen that as the motive power is applied through the said shaft and bevel gears 50 and 51 and the clutch mechanism just described, that the rotation of the lead wheel is effected and the tractor is turned upon a center determined by the intersection of the center line of the lead wheel and the transverse center line of the rear wheels. It will also be noted that the respective clutches 30 and 31 of the rear wheels are disengaged and that the source of power is alone taken through the lead wheel. In this position of the parts, the shortest turn possible is secured. A turning of this nature is very advantageous, especially when the tractor is used for plowing and other similar agricultural purposes.

The plow, for example, shown diagrammatically in dotted lines in Fig. 3, is preferably arranged so that the point is in the transverse center line of the rear wheels and spaced from and between the said wheels, a distance corresponding to the desired width of the furrow and other predetermined measurements of location required for the particular kind of farming for which it is used. It may be noted, however, in this connection that the lead wheel is shown to one side of the center of the tractor. This I find advantageous, because the location of the plow can be readily determined at a substantially central point of the tractor and in no way interferes with the turning of the tractor around the shortest radius above described. The plow is preferably arranged to one side of this central line drawn through the lead wheel so that when the shortest turn is made the point of the plow will be ready for the succeeding furrow.

In connection with the turning of the tractor, I provide locking devices, one of which I locate upon each rear wheel and the other at the central turning point. The locking devices upon the rear wheels may be of any preferred construction, and I do not limit myself to the exact construction herein shown. These devices are mounted upon a cross-bar 77 extending upwardly from the main frame and bridging the platform near the rear of the tractor at a convenient height thereabove. As shown (see Fig. 8), the devices comprise levers 78 pivotally arranged upon one side of the cross-bar and provided with a locking shoe 79 adapted to engage one of the traction cleats upon the wheels. A suitable pawl and segment 80 is provided in connection with the handle portion of the lever and permits of the holding of the shoe in any position, as will be readily understood. The purpose of these locking devices is to prevent the skidding or otherwise movement of the tractor when a turn is being made, as for example, if a turn is to be made around the center $a$ upon the rear wheel 15, the locking device upon the said wheel 15 is operated and the shoe 79 brought into engagement with the cleats upon the said wheel. The opposite wheel 14 being free to turn, the tractor is propelled by the said wheel 14 and guided by the lead wheel around the center $a$, which by reason of the engaging shoe is held fast from any tendency to move sidewise or revolve away from the turning point. Should the turn be made with the opposite rear wheel as the center, the opposite locking device will be operated in like manner. The locking device which I provide at the intersection of the central lines of the lead wheel and rear wheels comprises a vertically arranged pole or post 82, suitably guided through the platform 11, the cross bar 77 and by an elongated slot 83, through which the supporting axle of the rear wheels of the tractor extends. This post is pointed at its lowermost end and is adapted to be forced into the ground by the lever 84 pivotally supported at 85 upon the platform and provided with the usual locking pawl and segment 86. A pin and slot connection 87 provides for the reciprocation of the post vertically. This locking device is operated when the tractor is making the shortest turn possible around the center $b$, when the motive power is transmitted to the lead wheel, as has been heretofore described. When the post is in place in the ground the tractor is prevented from skidding or moving out of the desired turning position. Without the employment of such a device there would be a tendency to dislodge the tractor, upon the lead wheel contacting with stones and the like.

The steering mechanism which controls the movements of the lead wheel will now be described. It comprises a turn table which carries the lead wheel; and operating devices controlled from the platform of the tractor. As shown, these operating devices include a transverse shaft 89 mounted in extensions from the main frame at the rear of the tractor. Upon each end of the shaft is keyed a drum 90 around which are wound chains 91 and 92, respectively. These chains pass, one above and the other beneath the respective drums, and at one end are secured to the said drums, and at their other respective ends are fastened to the turntable at 93 and 94. Suitable tubular guides 95 are located upon each side of the tractor and direct the passage of the chains from the turntable to the winding drums.

The operating means for rotating the shaft 89 consists of a sprocket wheel 96 keyed to the said shaft, a chain 97 passing over the said sprocket wheel and around a similar sprocket wheel 98 mounted upon a shaft 99 positioned in suitable bearing 100 upon the cross bar 77. Upon the end of this shaft 99 a hand wheel 101 is provided. A rotation of this hand wheel by the operator will revolve the shaft 89 and thereby effect the winding of one chain and the unwinding of the other chain, and as a consequence the positioning of the lead wheel carried by the turn table in the direction which is desired to be traversed.

The easy manipulation of the lead wheel is produced by the novel form of roller bearing turntable which comprises an upper annular member 102, suitably grooved as at 103 to receive the chains 90 and 91, and a lower annular member 104 secured to the upper member 102 by the vertically arranged bolts 105 passing through spaced inwardly projecting lugs 106 upon the said members.

Rollers 107 are arranged upon these bolts 105 and bear horizontally against the inner wall of the inner bar frame section 5 of the main frame.

Operating between the upper and lower annular members of the turntable are vertically arranged rollers 108. These rollers operate between the spaced bars of the outer and inner frame structures constituting the main frame. As shown, these rollers are provided upon the forward half of the turntable, but I do not limit myself to the exact location of said rollers, for other similar and convenient constructions can be readily provided. Spacing blocks 109 are provided between the inner and outer bar frames. These are also interposed as one form of constructing the several parts.

By this construction it will be seen that as the turntable is operated by the hand-wheel 101, the upper member 102 will be turned in one direction. By reason of the connected parts and rollers the entire turntable will be easily moved until the lead wheel reaches the position desired.

As shown in Fig. 5 the position of this wheel determined the center upon which the tractor is to turn. This center can be located at any point in the transverse center line of the rear wheels and may be between the wheels, at either wheel, or outside of either of said wheels, as indicated at $c$.

From the foregoing it will be obvious that I have produced a practical traction engine embodying novel features for the easy and effective manipulation thereof, and readily adaptable for use as an agricultural implement, or as part of the power equipment only.

Having thus described my invention, what I claim and desire to secure by Letters Patent is:

1. In a traction engine of the class described, the combination of a frame provided with rear wheels, with a power transmission mechanism including a motor, a power shaft connected to said motor, independent means for connecting the power shaft to either of the rear wheels for propelling and turning the tractor, and a rotatable frame carrying a steering wheel and a clutch member, said clutch member adapted to be connected with the power shaft through the turning of the steering wheel.

2. In a traction engine of the class described, the combination of a frame having rear wheels, with a power transmitting mechanism including a motor, a power shaft connected to said motor, means including independently and simultaneously operated clutches for connecting the said power shaft to the rear wheels, a rotatable frame carrying a steering wheel and clutch member, and means for connecting the said clutch member to the power shaft for turning and propelling the tractor around a center within a less radius than the length of the machine through the steering wheel.

3. In a traction engine of the class described, the combination of a frame provided with rear wheels, a power mechanism including a motor, a power shaft connected to said motor, independent means for connecting the power shaft to either of the rear wheels for propelling and turning the tractor, said means including oppositely arranged clutch members provided on said power shaft, a rotatable frame carrying a steering wheel and a clutch member, and means for connecting said clutch member to the power shaft.

4. In a traction engine of the class described, the combination of a frame provided with rear wheels, and a power mechanism including a motor, a power shaft connected to said motor, means including independently and simultaneously operated clutches for connecting the said power shaft to either or both of the rear wheels for propelling and turning the tractor, a rotatable frame carrying a steering wheel and clutch member, and means for connecting the said clutch member to the power shaft for turning and propelling the tractor when one of the clutches for connecting the power shaft to one of the rear wheels is engaged.

5. In a traction engine of the class described, the combination with a main frame having independently driven rear wheels, of a rotatably mounted frame, a wheel carried by said rotatable frame provided with a clutch member, a transmission mechanism carried by the main frame and independently connected to each of said rear wheels, and means including a steering mechanism for bringing the wheel carried by the rotatable frame into operative connection with the motive power of either of the rear wheels for propelling and turning the tractor.

6. In a traction engine of the class described, the combination with a main frame having independently driven rear wheels, of a rotatably mounted frame, a wheel carried by said rotatable frame provided with a clutch member, a driving shaft having independently operated clutches for controlling the movement of the tractor through either of said rear wheels, another shaft operated by the driving shaft having a clutch member thereon designed to engage the clutch member provided on the rotatable frame when the wheel carried by the rotatable frame is turned at right angles to the rear wheels, and means including a steering mechanism for turning the said wheel at right angles.

7. In a traction engine of the class described, the combination with a main frame having independently driven rear wheels, of a rotatably mounted frame, a wheel carried by said rotatable frame provided with a clutch member, a driving shaft having independently operated clutches for controlling the movement of the tractor through either or both of said wheels, means for engaging the said clutches simultaneously, means for engaging either of said clutches independently, and means including a steering mechanism for bringing the aforesaid wheel of the rotatable frame into operative connection with the motive power for turning the tractor through either of the rear wheels.

In testimony whereof I affix my signature in presence of two subscribing witnesses.

BENJAMIN F. COOPER.

Witnesses:
ELIAS P. HARMON,
C. C. ALLISON.